United States Patent [19]
Thioux

[11] 4,085,828
[45] Apr. 25, 1978

[54] DISC BRAKE AND HEAT SHIELD FOR THE SAME

[75] Inventor: Alain Thioux, Chennevieres, France

[73] Assignee: Societe Anonyme D.B.A., Paris, France

[21] Appl. No.: 772,042

[22] Filed: Feb. 25, 1977

[30] Foreign Application Priority Data

Mar. 16, 1976 France .................... 76 07459

[51] Int. Cl.² .......................................... F16D 65/84
[52] U.S. Cl. ............................ 188/71.6; 188/264 AA
[58] Field of Search ............... 188/71.6, 73.6, 264 A, 188/264 R, 264 AA

[56] References Cited
U.S. PATENT DOCUMENTS

| | | | |
|---|---|---|---|
| 2,371,108 | 3/1945 | Oelkers | 188/71.6 X |
| 3,044,579 | 7/1962 | Klaue | 188/71.6 |

FOREIGN PATENT DOCUMENTS 280,267  12/1965  Australia .................... 188/71.6

Primary Examiner—Duane A. Reger
Attorney, Agent, or Firm—Paul David Schoenle; Ken C. Decker

[57] ABSTRACT

A disc brake comprising a caliper carrying a pair of friction pads and including a hydraulic fluid motor which directly applies one of said pads against a corresponding face of a disc and, by reaction through a sliding connection between the caliper and a fixed support, the other pad against the other face of the disc is disclosed. Extraction of the pad adjacent of the fluid motor is possible through a radial aperture in the caliper by moving the pad in front of a recess provided in at least one of circumferentially spaced edges of the aperture, said aperture being offset towards the fluid motor. A removable heat shield is normally inserted between the fluid motor and its adjacent pad to avoid escape of the latter and to avoid boiling of the hydraulic fluid in the fluid motor due to heating of the brake.

7 Claims, 4 Drawing Figures

DISC BRAKE AND HEAT SHIELD FOR THE SAME

The invention relates to a disc brake for a motor vehicle.

More particularly, the invention relates to a disc brake of the type comprising brake applying means associated with a caliper so as to urge two friction pads towards the respective faces of a rotary disc, the applying means comprising at least one piston mounted in a cylinder and capable of moving towards the disc out of an idle position so as to urge one of the pads towards the corresponding face of the disc on operation of the brake.

When operation of a disc brake of this type is repeated in quick succession for a relatively long period, as, for example, when the vehicle is covering very hilly country, the frictional contact between the friction linings and the disc makes the linings very hot. Consequently the remainder of the brake also becomes hot, doing so very rapidly if the linings contain materials which are good thermal conductors, as is the case, for example, when they comprise metal elements.

Under particularly adverse conditions, the heating of the brake may be sufficient to boil the hydraulic brake fluid between the cylinder and the piston.

There have already been various solutions to this problem. One consists in minimizing the areas of contact between the piston and the pad, for example by grooving the end of the piston, so that air can flow between the pad and the piston and thermal conduction between these components is reduced. This solution has the disadvantage that points of contact between pad and piston still remain and that it demands special machining of the piston and therefore a substantial increase in its cost.

Another known solution is to provide an insulating layer on the front surface of the pad or between the backing plate and the lining thereof. This eliminates problems of heat conduction, but requires the manufacture of a special friction pad substantially dearer than an ordinary pad, and this is particularly undesirable since the pads must be changed several times during the life of the brake.

The invention proposes a novel solution which almost completely eliminates heat conduction between the pad and piston and allows the use of ordinary pads without requiring changes to any of the components of the brake.

According to the invention, a disc brake of the type defined above is characterized in that a detachable heat shield is provided between the piston and the said pad, the shield comprising at least one layer of thermal insulation.

According to another aspect of the invention, the caliper comprises an aperture defining two circumferentially spaced edges, each edge comprising at least one sliding surface with which the pad cooperates according to the wear on its lining, at least one of said edges also comprising a recess offset towards the piston relative to the corresponding sliding surfaces, the dimensions of the recess permitting radial extraction of the pad through the aperture in the absence of the heat shield when the piston is in its idle position, and preventing this extraction in the presence of the heat shield.

In this particular embodiment of the invention the heat shield, besides acting as a shield, locks the pad and guarantees correct positioning of the pad during assembly. In effect, the heat shield cannot be inserted between the pad and the piston unless the pad is parallel to the disc. Furthermore, the axial dimension of the brake is reduced because, thanks to the introduction of the heat shield, it is not necessary to provide extra space in the cylinder so that the piston can retract far enough to allow the pad to be extracted radially through the aperture.

The invention also consists of a detachable heat shield for a brake of this kind, the shield being characterized in that it comprises a substantially flat plate and a layer of thermal insulation associated with at least one side of this plate, the plate comprising a portion which does not bear thermal insulation and of which one end is substantially at right-angles to the said side of the plate, two apertures being formed in said portion of the plate near the bent end.

A particular embodiment of the invention will now be described by way of example only, with reference to the accompanying drawings in which.

Figure 1:
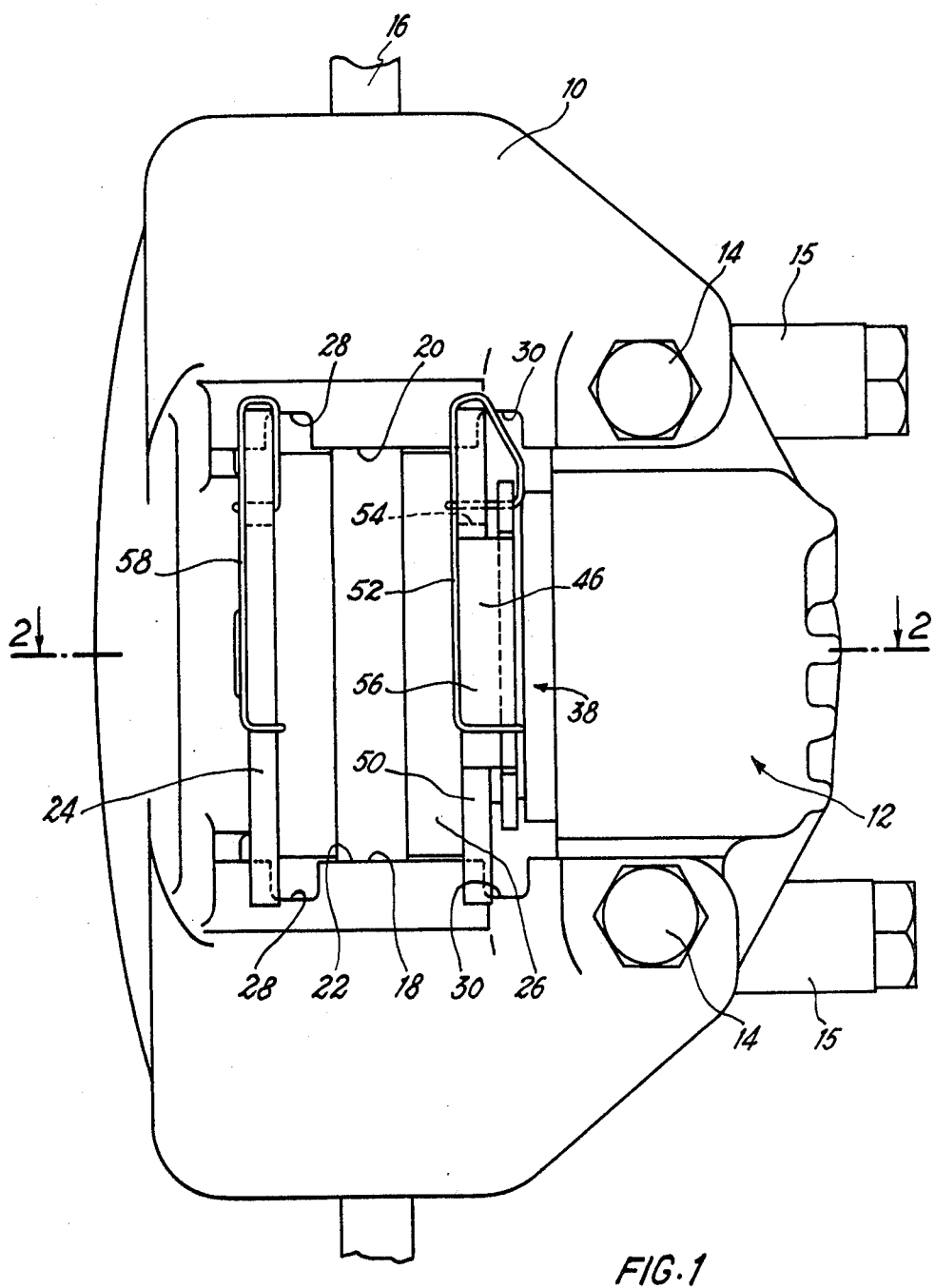
FIG. 1 is a diagrammatic plan view of a disc brake constructed in accordance with the principles of the invention.
Figure 2:
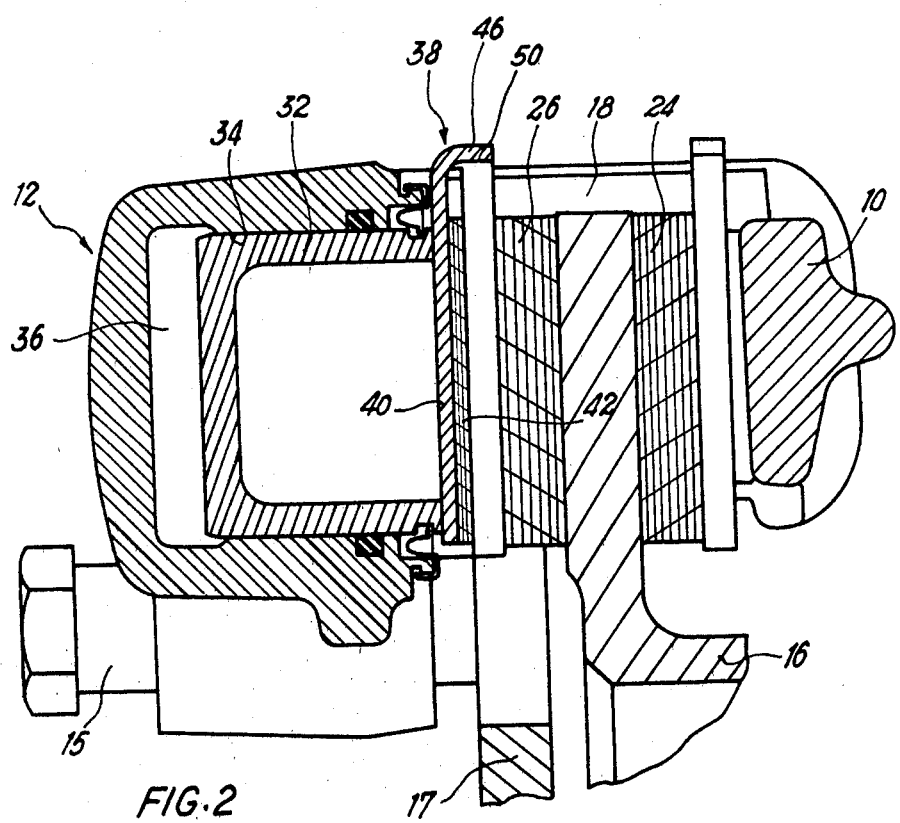
FIG. 2 is a section along a line 2—2 in FIG. 1.

The disc brake shown in FIGS. 1 and 2 has a movable frame or caliper 10 in the form of a C, attached by bolts 14 or equivalent fixing means to brake applying means generally designated 12. The caliper 10 is slidably mounted for example by means of pins 15 on a fixed support 17 designed to be mounted on a fixed element of the vehicle (not shown). The caliper 10 overhangs a disc 16 and defines with the brake applying means 12 a substantially rectangular aperture 18 over the disc. The aperture 18 has two circumferentially spaced edges 20, 22 on which an outer pad 24 and an inner pad 26 are mounted. Each of the pads 24, 26 comprises a backing plate and a friction lining attached thereto by any known means, for example adhesive or rivets. Respective recesses 28 are formed opposite one another in each of the edges 20, 22 of the aperture 18 so that the pad 24 can be extracted radially through the aperture 18 when its backing plate is brought opposite the recesses 28, which are offset towards the disc relative to the position occupied by the pad 24 when mounted on the brake. Similarly, respective recesses 30 are formed opposite one another in each of the edges 20, 22 of the aperture 18 so that the pad 26 can be extracted radially through the aperture 18 when its backing plate is brought opposite the recesses 30, the latter being offset away from the disc relative to the position occupied by the pad 26 when the brake is in the operative condition.

In the described embodiment, the brake applying means, 12, best shown in FIG. 2, comprise a piston 32 slidable in a cylinder 34. The piston and cylinder together define a control chamber 36 which can be connected to a hydraulic pressure fluid source, for example the master cylinder (not shown) of the vehicle.

Figures 3, 4:
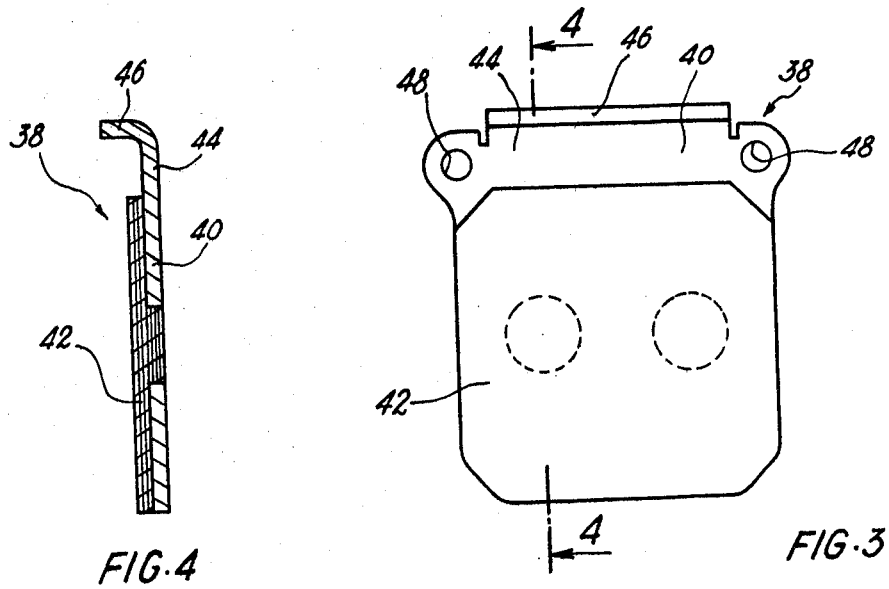
FIG. 3 is an elevation of a heat shield embodying the principles of the invention, for use in the disc brake shown in FIGS. 1 and 2.
FIG. 4 is a section along a line 4—4 in FIG. 3.

In accordance with the invention, a heat shield generally designated 38 and shown separately in FIGS. 3 and 4 is detachably mounted between the piston 32 and the pad 26. The heat shield 38 comprises a substantially flat plate 40 bearing a layer 42 of thermal insulation, for example a conventional organic insulator or asbestos mixed with any binder. The plate 40 includes a portion 44 which is devoid of insulation and of which the end 46 is bent substantially at right-angles to that side of the plate 40 bearing the insulation 42. There are two apertures 48 in the portion 44 of the plate 40, near the end 46. When the heat shield 38 is mounted on the brake, the end 46 points towards the disc 16 and forms a flap bearing on the upper edge 50 of the backing plate of the pad 26. The flap 46 therefore forms part of detachable fixing means attaching the heat shield 38 to the friction pad 26. The remainder of the detachable fixing means comprises a clip 52 made from resilient wire and also acting as a noise reducing spring for the pad 26. The clip 52 passes through an aperture 54 in the backing plate of the pad 26 and through one of the apertures 48 in the heat shield plate 40. Also, the clip 52 bears on the upper edge 56 of the flap 46 and on the sliding surface at the edge 20 of the aperture 18. The heat shield 38 is substantially symmetrical relative to a plane perpendicular to the flat portion and bent portion 46 of the plage 40. A noise reducing spring 58 comparable to the clip 52 is attached to the pad 24.

The disc brake just described operates as follows:

The various components of the brake occupy the positions shown in FIGS. 1 and 2 when idle.

When hydraulic pressure fluid is fed to the chamber 36 from the master cylinder of the vehicle (not shown) the piston 32 is urged to the right in FIG. 2 and pushes the pad 26 towards the disc 16 by way of the heat shield 38. Due to reaction, the assembly comprising the caliper 10 and brake applying means 12 tends to slide to the left in FIG. 2 along the pins 15, so that the friction pad 24 is brought into frictional contact with the associated face of the disc 16, so operating the brake. The heat generated by frictional engagement between the disc 16 and pad 26 during repeated operation of the brake may be transmitted very rapidly to the braking plate of the pad 26, especially if the lining of this pad contains elements which conduct heat well, such as metal. However, the thermal insulation layer 42 acts as a heat shield and much reduces the conduction of heat to the piston 32, so removing the risk that the hydraulic fluid admitted to the chamber 36 will become dangerously lot.

The heat shield 38 also locks the pad 26 in position in the brake shown in FIGS. 1 and 2. Replacement of the friction elements 24, 26 is carried out as follows.

Removal of the clip 52 enables the heat shield 38 to be extracted radially, so that the backing plate of the friction pad 26 can be brought opposite the recesses 30 in the edges 20, 22 of the aperture 18. The pad 26 can now be extracted radially through the aperture 18, whereupon the assembly comprising the caliper 10 and brake applying means 12 can be slid along the pins 15 to bring the backing plate of the pad 24 opposite the recesses 28 in the edges 20, 22 of the apertures 18, so allowing radial extraction of the pad 24 through the aperture 18, so allowing radial extraction of the pad 24 through the aperture 18. The friction elements 24, 26 are replaced in the reverse order that is, first the pad 24 is introduced through the recesses 28 and placed in the position shown in FIG. 1, and then the assembly comprising the caliper 10 and brake applying means 12 is slid along the pins 15 into the position shown in FIG. 1. The pad 26 is then inserted through the recesses 30 and brought into the position shown in FIG. 1, whereupon the heat shield 38 is put on and is locked with the clip 52. If for any reason the pad 26 should be introduced askew relative to the disc 16, the heat shield 38 could not be replaced. Insertion of the shield therefore guarantees correct installation of the pad 26.

Furthermore, if the brake was not provided with the heat shield 38, the piston 32 would have to be longer to ensure that the pad 26 was locked in position. Consequently, the cylinder 34 would also need to be longer, to allow the piston 32 to retract far enough to enable the pad 26 to escape through the recesses 30. A brake fitted with the heat shield 38 can therefore have a smaller axial dimension than a brake of the same type without the shield.

Although a heat shield embodying the principles of the invention has numerous advantages when applied to a disc brake of the type described with reference to FIGS. 1 and 2, the invention is not restricted to this type of brake.

Similarly, the thermal insulation on the heat shield described with reference to FIGS. 3 and 4 may be of any other type known for its thermal insulation properties, without exceeding the scope of the invention.

What we claim is:

1. A disc brake comprising brake applying means cooperating with a caliper so as to urge two friction pads toward respective faces of a rotary disc, said brake applying means comprising at least one piston mounted in a cylinder and capable of moving toward the disc from an idle position so as to urge one of the pads toward a corresponding face of the disc upon operation of the brake, a detachable heat shield between said piston and said one pad, the shield having at least one layer of thermal insulation, said caliper including an aperture defining two circumferentially spaced edges, each edge defining at least one sliding surface with which the pad cooperates according to the wear on its lining, at least one of said edges also including a recess offset toward the piston relative to the corresponding sliding surface, the dimensions of the recess permitting radial extraction of the pad through the aperture in the absence of the heat shield when the piston is in its idle position and preventing this extraction in the presence of the heat shield.

2. A disc brake as claimed in claim 1, wherein the heat shield is normally connected with the pad by detachable fixing means.

3. A disc brake as claimed in claim 1, wherein the heat shield is normally connected with the pad by detachable fixing means, the heat shield being a plate of which at least one side bears the layer of thermal insulation.

4. A disc brake as claimed in claim 3, wherein the detachable fixing means comprise at least one flap bent towards the disc from the said plate and capable of bearing on the upper edge of the pad.

5. A disc brake as claimed in claim 4, wherein the detachable fixing means further comprise a resilient clip traversing an aperture in the backing plate for the lining of the pad and an aperture in the said heat shield plate.

6. A disc brake as claimed in claim 5, wherein the clip is a wire spring which also cooperates with at least one of the sliding surfaces so as to form a noise reducing spring.

7. A disc brake as claimed in claim 1, wherein the heat shield comprises a substantially flat plate and a layer of thermal insulation is connected with at least one side of this plate, the plate comprising a portion which does not bear thermal insulation and of which one end is bent substantially at right-angles to the said side of the plate, two apertures being formed in said portion of the plate near the bent end.

* * * * *